Patented May 31, 1938

2,119,234

UNITED STATES PATENT OFFICE 2,119,234

METHOD OF TREATING WOOD FOR THE RAPID MATURATION OF WHISKEY AND OTHER ALCOHOLIC LIQUORS AND WINES

Ernst T. Krebs and Ernst T. Krebs, Jr., San Francisco, Calif.

No Drawing. Application July 14, 1937, Serial No. 153,674

6 Claims. (Cl. 99—48)

This invention is a modification and improvement over our former patent entitled "Method of treating oakwood for the aging of spiritous liquors", No. 2,070,794, issued February 16, 1937.

The object of the present invention is to provide a method whereby the so-called aging changes occur more rapidly, more tannoid reduction is insured, and higher acid development and greater economy is obtained.

The method is divided into four steps: first, the preparation of the enzymes; second, the preparation of the wood; third, the treatment of the wine or liquor with the wood; and fourth, the final marrying or stabilization of the liquor.

In describing the first step of the process, to-wit the preparation of the enzymes, an example will be given using the kernels of *Prunus armeniaca* for the extraction of the enzymes. However, the kernels of any other of the Prunus family may be used, or many other seeds such as mustard, rape, hemp, etc., may be used for this process with more or less satisfactory results. In fact, the enzymes which are an emulsin complex may be obtained from other sources such as yeast, crytogamic growths, fungi, algae, certain bacteria, etc.

One pound of the kernels of the seed of *Prunus armeniaca*, fresh or partly germinated, of the current year is ground in a grinding machine and then placed in a ball mill with 1000 c. c. of water and ground for several hours. As the emulsion thickens, more water is added until about 2000 c. c. have been added. When a fine, almost impalpable emulsion is produced, remove the emulsion from the ball mill and add about 400 c. c. of ether. Now agitate vigorously for at least ten minutes. Then pour in a percolator and allow to remain for twelve hours more or less. When the aqueous layer separates to the bottom of the percolator, it is drawn off and placed in a tightly stoppered bottle for use. This is the mother solution containing the enzymes sought and about 8% ether. This solution should be kept in a cool place and used within seventy-two hours.

The second operation of the process concerns the preparation of the wood. The wood of *Quercus alba* will be taken as an example for the preparation of the wood since whiskey and other liquors and wines are usually aged in containers made of this wood, although the wood of *Glycyrrhiza glabra*, *althea*, etc., will produce practically the same results. The well seasoned dry wood of *Quercus alba* is comminuted preferably as chip shavings about the thickness of ordinary writing paper and then toasted to a light golden brown color in a revolving or other suitable toaster. To each bulk gallon of toasted chip shavings is added about 500 c. c. of water, which is well mixed with the chip shavings until they become uniformly moistened. The next day about three ounces of the mother enzyme solution containing the ether, as previously specified, is added and thoroughly mixed through the moistened shavings, and after about twelve hours the vessel containing the shavings is kept well covered until the treatment is completed. In the treatment of the shavings with the mother enzyme solution containing ether, from fifteen to thirty days is required.

The shavings should be frequently tested for acid development, beginning about the tenth day, and when the acid development in the shavings turns blue litmus paper to a distinct pink color, a small sample of the shavings should be digested in one hundred proof alcohol for an hour or two, and this solution should be tested by adding a drop or two of a one per cent solution of ferric chloride to about 4 c. c. of the alcoholic extract. When the test shows an amber or olive green color, the shavings are ready to receive the raw whiskey or other liquor or wine to be aged.

In the case of whiskey, about three to six times (depending upon the character of the wood) the quantity of whiskey to bulk shavings is added and allowed to macerate one hour. It is then drawn off and the proof is taken and enough water or new whiskey is added to bring it to one hundred and two proof. It is now poured back upon the shavings and allowed to macerate for several hours and then percolated off and placed in glass or charred oak containers for at least thirty days to undergo the change which whiskey manufacturers call marrying, which is a stabilization process, no doubt, of ionization and further esterification. In the aging of Scotch whiskey, more or less untoasted chip shavings should be added to the treated toasted chip shavings.

It appears that emulsin itself is not the agent which is directly responsible for the change in the chemical structure of the tannins and tannic compounds of the wood. The emulsin complex stimulates a profuse cryptogamic growth, which growth produces an emulsin complex rich in tannase, and it is apparently this emulsin complex which changes the tannins and tannic compounds.

For wine, the process of treating the chip shavings is precisely the same. The amount of wine to be added to the treated shavings and length of time of maceration depends on the type of wine to be treated and upon the taste and quality of wine desired. The best results are obtained by using new wine in which the alcoholic fermentation has entirely subsided and the acetic stage has set in sufficiently to give the wine a distinct acid taste.

The purpose of toasting the comminuted wood or shavings is to dehydrate the tannins contained in the wood. When water is again added during the first step of treating the shavings, the tannins again become hydrated, which tannoid is apparently an intermediate tannoid body between gallic and ellagic acid, giving a blue reaction with ferric salts. When these are later acted upon by the emulsin complex rich in tannase secreted by the cryptogamic growth, they are apparently oxidized to ellagic acid, which again gives a green coloration with ferric salts. The ether contained in the mother liquid containing the enzymes combines with the hydrated and partly broken down tannins, losing its oxygen and forming an ethyl compound with these tannins, any excess of ether forming acetic and allied acetic acids.

The enzymes represented by the emulsin complex stimulates a profuse cryptogamic growth from the shavings, which growth is rich in aminosuccinamide. The cryptogamic growth secretes an emulsin complex which is rich in tannase. This complex, mainly through its tannase constituent, further breaks down the tannoid bodies, forming, apparently, mainly ellagic acid which gives an olive green color with ferric salts. The aminosuccinamide furnishes oxygen to the reaction and splits up into succinic and succinamic acids and amino compounds with products of the tannin.

When the new whiskey containing ethyl and other alcohols is added to the treated shavings and is allowed to macerate for several hours, all the changed products of the wood which are soluble in a hydro-alcoholic solution dissolve, leaving practically nothing behind but the cellulose, and it is for this reason that only a few hours are required for the maceration of the hydro-alcoholic solution in the treated wood. The whiskey is now placed in suitable containers, such as charred oak barrels, glassware, or the like, as it needs no further treatment with the oakwood.

The reaction which takes place between the products leached from the wood, and the whiskey, are as follows: The aminosuccinamide breaks down into succinic and succinamic acids, and the amino constituent forms compounds with the broken down tannoid bodies (mainly querco-glycyrrhizic acid); this furnishes the oxidation required to bring about aldehydation and acetylization. Esterification follows slowly as a matter of course. At the end of thirty days, the whiskey can be drawn off from the slight sediment and bottled, and is ready for use, the maturity of the whiskey being equivalent to a six or eight year old product aged in the customary way in charred oak barrels.

This method produces the same biological (cryptogamic growth) and chemical phenomena which occur in the staves of the charred oak barrel containing whiskey with the advantages that the so-called aging changes occur more rapidly, and more tannoid reduction, higher acid development and greater economy is obtained. The principal advantage is due to better tannoid reduction and greater ethyl esterification of the tannoid acids due to introducing the ethyl radical in the form of ether and apparently forming tannic, gallic and ellagic aldehydes or principally the latter which otherwise form slowly.

Having thus described our invention, what we claim and desire to secure by Letters Patent is:

1. A method of treating oak wood to stimulate a profuse cryptogamic growth in the wood, which growth is rich in aminosuccinamids and an emulsin complex rich in tannase, the steps which consist in reducing the wood to comminuted form, toasting it to dehydrate the tannin contained, and moistening the comminuted toasted wood with a solution containing an emulsin complex and ether and maintaining the wood in the moistened condition until a maximum cryptogamic growth and the resultant secretion of emulsin complex rich in tannase is obtained.

2. A method of treating oak wood to stimulate a profuse cryptogamic growth in the wood, which growth is rich in aminosuccinamids and an emulsin complex rich in tannase, the steps which consist in reducing the wood to comminuted form, toasting it to dehydrate the tannin contained, and moistening the comminuted toasted wood with a solution containing an emulsin complex and ether which will produce esterification and maintaining the wood in the moistened condition until a maximum cryptogamic growth and a secretion of emulsin complex rich in tannase is obtained.

3. A method of treating oak wood to stimulate a profuse cryptogamic growth in the wood, which growth is rich in aminosuccinamids and an emulsin complex rich in tannase, the steps which consist in reducing the wood to comminuted form, toasting it to dehydrate the tannin contained, moistening the comminuted toasted wood with a solution containing an emulsin complex and ether, maintaining the wood in the moistened condition until a maximum cryptogamic growth is obtained and a secretion of emulsin complex rich in tannase is formed, and leaching the treated wood with the liquor to be aged until the changed products of the wood are dissolved and removed by the liquor, and then placing the liquor in a container to permit oxidation, aldehydation and esterification of the liquor.

4. In a method of treating oak wood to produce a prolific cryptogamic growth which promotes oxidation, aldehydation and esterification during the aging of spiritous liquors, the steps which consist in reducing the wood to a comminuted form, and moistening the comminuted wood with a solution containing an emulsin complex and ether which will produce esterification.

5. In a method of treating oak wood to produce a prolific cryptogamic growth which promotes oxidation, aldehydation and esterification during the aging of spiritous liquors, the steps which consist in reducing the wood to a comminuted form, and moistening the comminuted wood with a solution containing ether and an emulsin complex derived from the genus Prunus.

6. In a method of treating oak wood to produce a prolific cryptogamic growth which promotes oxidation, aldehydation and esterification during the aging of spiritous liquors, the steps which consist in reducing the wood to a comminuted form, and hydrolizing the tannin and tanno compounds contained in the comminuted wood by subjecting the wood to the action of a solution containing ether and an emulsin complex derived from a source other than the wood.

ERNST T. KREBS.
ERNST T. KREBS, Jr.